Jan. 11, 1955   M. M. ESCURE   2,698,952
AUTOMATIC SCREW-THREADING ATTACHMENT FOR LATHES
Filed July 7, 1951   8 Sheets-Sheet 1

Fig. 1

Inventor
MARCEL MARIUS ESCURE
By:
Hazeltine, Lake & Co.
Agents

Fig. 2

Jan. 11, 1955   M. M. ESCURE   2,698,952
AUTOMATIC SCREW-THREADING ATTACHMENT FOR LATHES
Filed July 7, 1951   8 Sheets-Sheet 4

M. M. ESCURE 2,698,952

AUTOMATIC SCREW-THREADING ATTACHMENT FOR LATHES

Filed July 7, 1951

Fig. 16 ically # United States Patent Office 2,698,952
Patented Jan. 11, 1955

2,698,952

AUTOMATIC SCREW-THREADING ATTACHMENT FOR LATHES

Marcel Marius Escure, Eygurande, France, assignor to Jean Victor Goasguen, Monaco Application July 7, 1951, Serial No. 235,609

Claims priority, application France July 7, 1950

15 Claims. (Cl. 10—101)

This invention relates to an additional apparatus which can be mounted on an ordinary lathe, for effecting various operations, such as screw-threading for instance, without requiring any modification in the lathe.

This apparatus is provided with a power take-off arrangement deriving its drive from the lathe, with a tool carriage and a control for said carriage, from a cam with a fixed run.

One object of the invention is to make it possible to change the pitch of the screw thread without changing the cam. In addition, the power take-off is effected on the lathe spindle and not, as in some apparatus, on the carriage bar or on the leading screw. It offers the advantage that it can be mounted, not as in certain apparatus, in place of the front tool holder turret, but in place of the rear tool holder, so that the tool carriage of the apparatus has the same appearance as an ordinary rear turret, and the lathe preserves all its working possibilities in their entirety.

In the apparatus of the invention the control cam for the displacement of the tool carriage is given a rotary motion, the ratio of which to that of the spindle is constant, i. e. which turns through one revolution for a predetermined number of turns of the spindle.

The adjustment of the pitch to be obtained results from the combination of an orientable mechanism with a constant run, controlled by the cam and controlling the variable displacement run of the tool carriage.

The control cam for depth feeding effects one revolution per complete cycle in screw cutting and the depth of the thread corresponds to the topmost point of the cam, so that this depth cannot be exceeded.

The invention also covers other arrangements relating especially to the power take-off, to the withdrawal of the tool during the return run, to the depth of penetration of the tool, to the adjustment of the number of cuts and to the automatic stopping of the tool carriage in a disengaged position so as to obtain a perfect automaticity of these movements. These arrangements will appear from the explanations given hereinafter.

The following description, with reference to the appended drawings given by way of examples, is relative to one type of embodiment and will allow a clear understanding of the invention.

Figure 1:
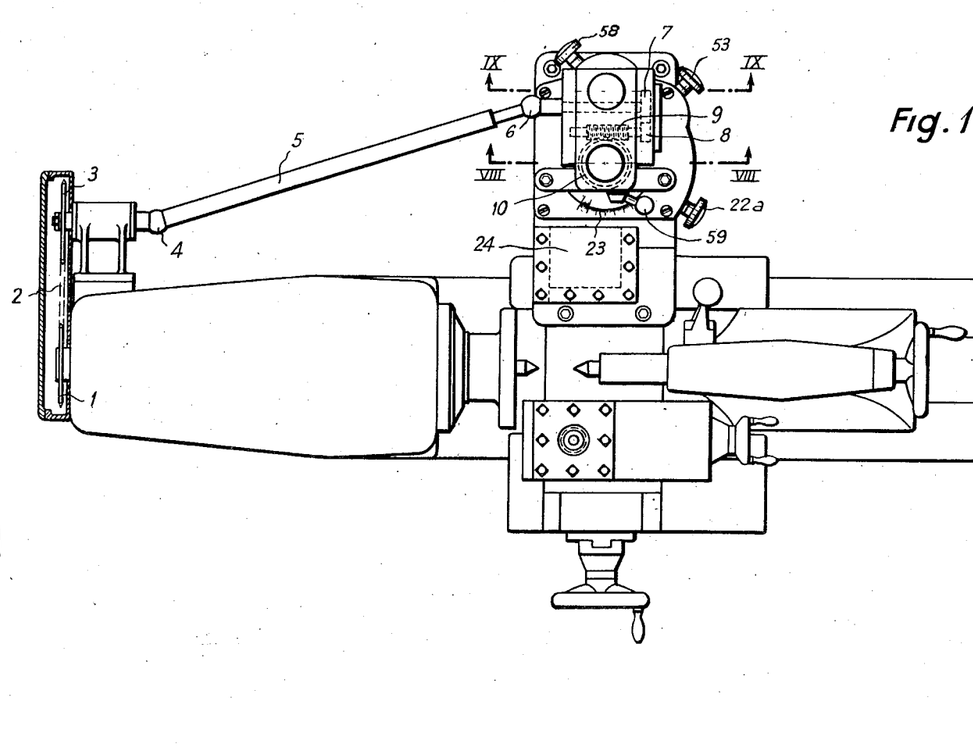
Figure 1 shows a plan view of the assembling of the apparatus on a horizontal lathe and the detail of its power take-off on the lathe spindle.
Figure 2:
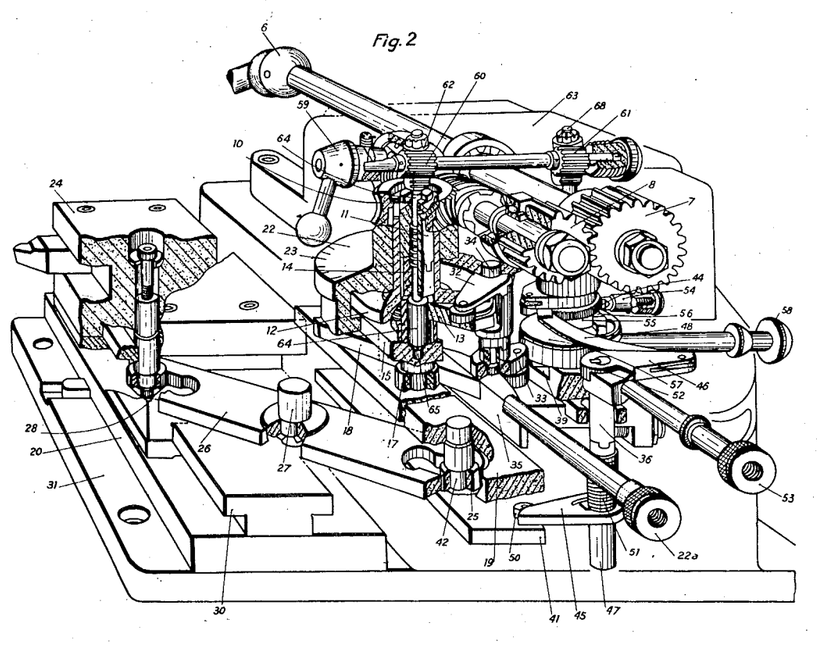
Figure 2 is a perspective view, partly in section, of the whole apparatus showing the arrangement and relation between the main elements.

The power take-off on the lathe spindle, shown in Figures 1 and 2 comprises a driving pinion 1 mounted on the lathe spindle and connected through the chain 2, the driven pinion 3 and the universal joint 4 with a slide shaft 5, also connected through the universal joint 6, the interchangeable pinions 7 and 8 with a tangent screw 9, the corresponding helical wheel of which, 10, carries a dog 11, making it possible to clutch in the associated cams 12 and 13 by means of a sliding gear 14 (Figs. 2 and 8).

Figures 3, 4:
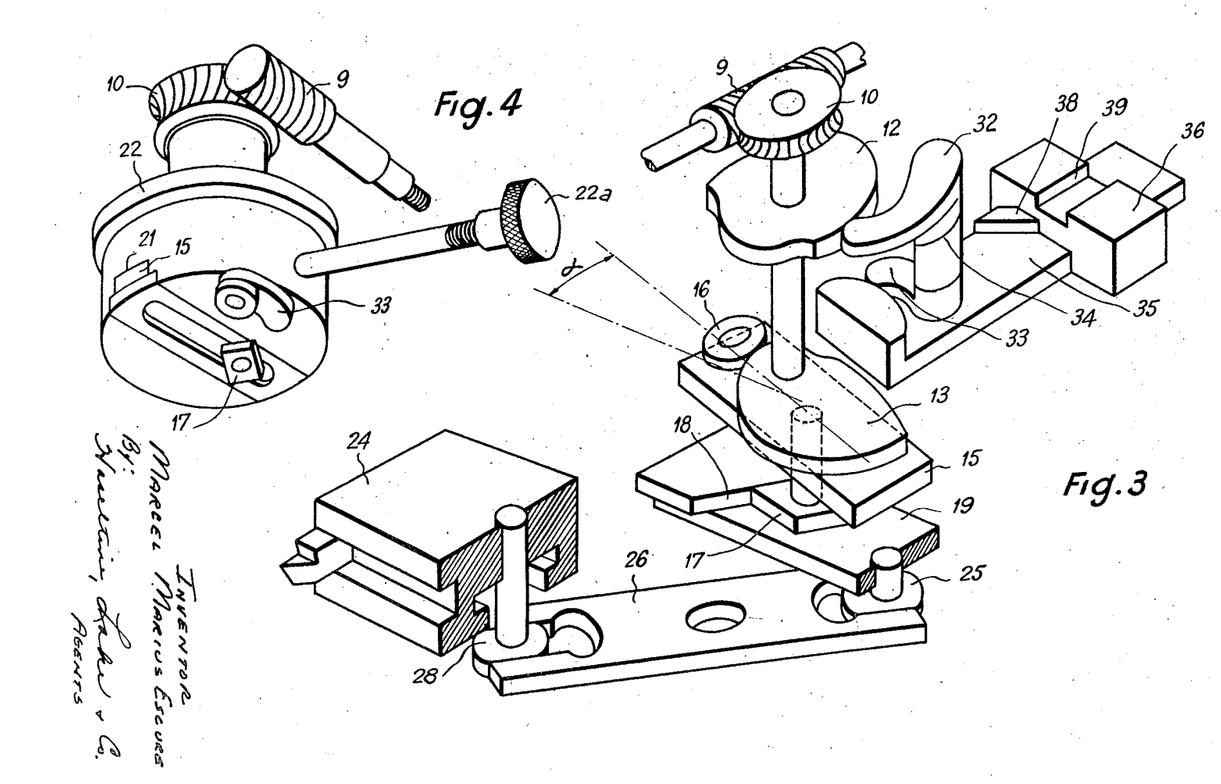
Figure 3 is a perspective schematic view of the device for pitch selection and of the control movement for the advance and return of the tool holder.
Figure 4 is a perspective view, from underneath, of the casing of the pitch selection arrangement.

The pitch selecting device, Figs. 2 and 3, mounted on a bridge associated with the fixed bottom slide 31, comprises an orientable slide block 15 which carries, on its upper face, a roller 16, rolling on the cam 13 and on its lower face a shoe 17 bearing on an oblique heel 18 associated with a slide block 19 sliding inside a groove in the bottom slide 20.

The slide block 15 can be oriented within the limits of an angle α, shown on Figure 3, by means of a groove 21, contained in a casing 22, concentric with the axis of rotation of the cams (Figure 4). The casing 22 can rotate about its axis and act on a lever provided with a knurled knob 22a.

The slide block 19 is thus controlled by the slide block 15 itself controlled by the cam 13, but while the slide block 15 has a constant run, the run of the slide block 19 depends on the angle α.

By adjusting the angle α, by means of a calibration 23 (shown in Figures 1, 2 and 5), the run of the tool holder is adjusted and, consequently, the pitch angle setting.

Figure 5:
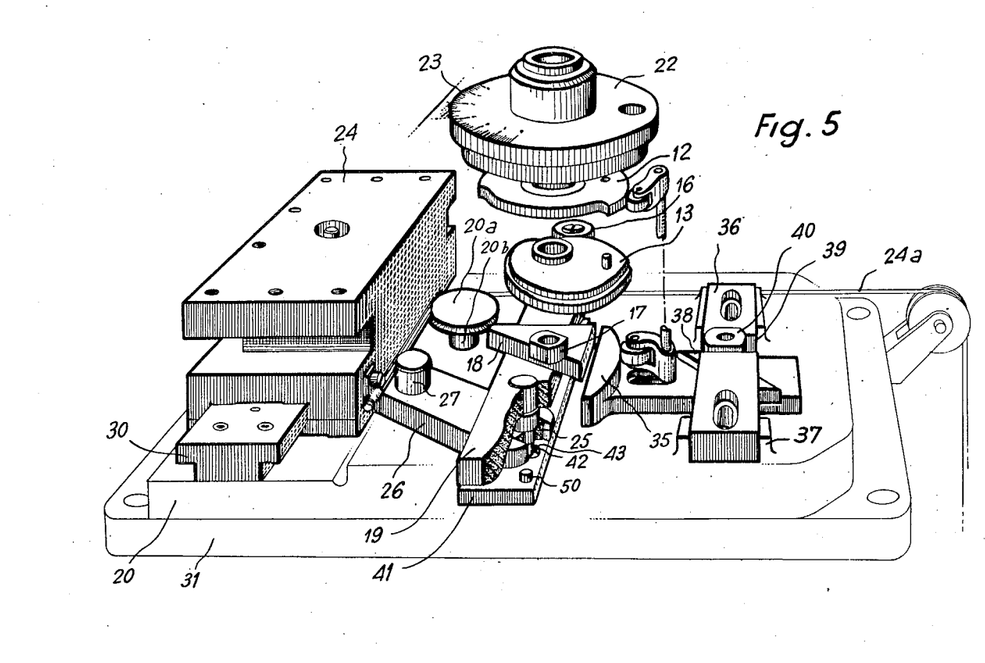
Figure 5 is a partial perspective view, with parts broken away, of the main elements for the control of the tool holder and of the counter-weight device for the return and play take-up.

The pitch selection system is connected with the tool holder 24, through a shoe 25 carried by the slide block 19, a balance-element 26 rocking about an axle 27, secured on the bottom slide 20 and a shoe 28 (Figures 2–3 and 5).

A counter-weight placed at the back of the apparatus and not shown on the drawings, is attached to the tool holder 24 through the flexible cable 24a passing over a pulley 20a the axle of which 20b is secured to the bottom slide 20 (Fig. 5).

As will be seen later, this counter-weight has a multiple action. One of its functions is constantly to apply the heel 18 of the slide block 19 against the shoe 17 of the pitch selecting device and in addition it takes up any play in the tool holder control mechanisms.

Figure 6:
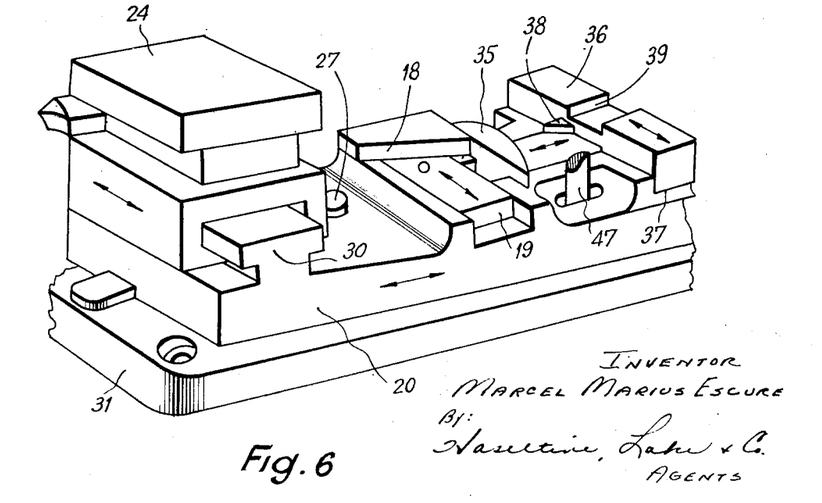
Figure 6 is similar to Figure 5 but seen from another angle and showing the imbedding and the guiding of the rams in the tool holder bottom slide.

The tool holder 24 slides inside a slide 30 oriented parallel to the generatrices of the part to be threaded (Figs. 2, 5 and 6).

The slide 30 is carried by the shoe 20 sliding on a fixed bed plate 31 in a direction perpendicular to the generatrices of the part to be threaded.

The bottom slide 20 displaces the tool either for depth feed or for disengagement under the control of a cam 12 called "return cam" with a possibility of adjustment by a depth feed mechanism described further on.

The so-called "return cam" 12 (Figure 3) controls, through the rockers 32 and 33 mounted on a shaft 34, a heeled slide block 35 in the same direction of displacement as the bottom slide 20 (as will be seen further on).

The advance motion occurs at the time when the tool is beginning a cut and the return motion at the time when the tool is finishing a cut.

The motions of the slide block 35 (Figs. 5 and 6) are transmitted to the bottom slide 20 by a cross piece 36, the position of which is adjustable in a groove 37 provided in said slide. The groove 37 is perpendicular to the direction of displacement of the bottom slide 20. The cross piece 36 is connected with the slide block 35 by a key bolt 38 inclined at 45°.

The purpose of this arrangement is to locate the bottom slide 20 independently of the slide block 35 while preserving the same run and to make it possible to displace the to and fro motion of the bottom slide 20.

Figure 7:
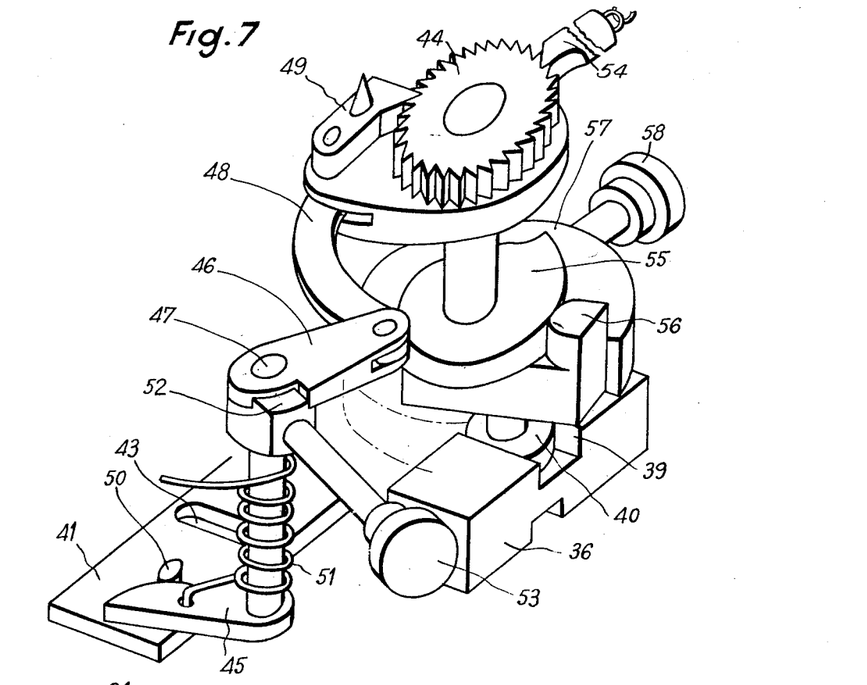
Figure 7 is a perspective view of the devices for the control of the depth feed and for the adjustment of the number of cuts.
Figure 8:
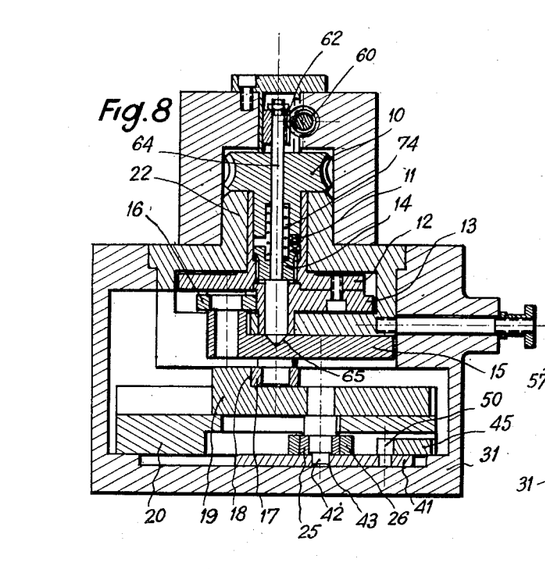
Figure 8 is a section along line VIII—VIII, Figure 1.

To this effect, the cross piece 36 comprises a groove 39 oriented parallel with the direction of displacement of the bottom slide 20, and which engages a shoe 40, carried by the depth feed control device (Figure 7).

Under the action of the above mentioned counter-weight, and since the axle 20$^b$ of the spool 20$^a$ is associated with the bottom slide 20, the latter, by means of the cross piece 36 and the oblique key bolt 38, keeps the slide block 35 constantly in contact with the rocker 33 and consequently keeps the rocker 32 against the cam 12. As above, the action of the counter-weight has the additional effect of taking up the play in this mechanism.

The advance and return motion of the tool holder, associated with the depth feed motion being thus described, it is easy to understand the reason for the obliquity of the heel 18.

Considering that the slide block 19 is carried by the bottom slide 20, that the shoe 17 carried by the slide block 15 bears against the inclined edge of the heel 18 and that the slide block 15 is fixed, any oscillation motion of the bottom slide 20 will be converted into a displacement of the slide block 19 and consequently of the tool holder 24.

The combination of the motions of the bottom slide 20 and slide block 19 gives the tool holder 24 a resultant motion oriented with respect to the axis of the part to be threaded along a direction at an angle equal to that of the heel 18 with the direction of displacement of the slide block 19 in the bottom slide 20.

The depths feed adjustment device (Figure 7) is based on the same principle as that described in the pitch selection device.

This mechanism, like the pitch selection device, is fixed on the same bridge associated with the fixed bed plate 31.

The slide block 19 is coupled with a straight edge 41 by an extension of the axle 42 of the shoe 45 entering a slot 43 of the straight edge. The displacements of the slide block 19 are transmitted to the straight edge 41. This straight edge 41 controls a ratchet wheel 44 by means of the levers 45 and 46 keyed on a vertical shaft 47 and of a connecting rod 48 applying the pawl 49 into permanent contact with the ratchet wheel 44. The lever 45 pushed by the stud 50 positioned on the straight edge 41 is constantly brought back towards the latter by a torsion spring 51; a stop 52 capable of rotating about the axle 47 is operated by a lever with a knurled knob 53; it is used for limiting the angular displacement of the lever 46 and, consequently, the run of the pawl 49 on the ratchet wheel 44; the motions of the latter are braked by means of the push element 54, particularly during the return motions of the pawl.

A cam 55, keyed on the ratchet wheel 44, controls a slide block with a heel 56 carrying the shoe 40 engaged in the groove 39 of the cross piece 36 as above described.

Each end of run of the pawl brings a new position of the heeled slide block 56 in contact with the cam 55 and consequently a new position of the cross piece 36, the bottom slide 20 and the tool carrier 29.

By adjusting the range of motion of the lever 46 by means of the stop 52 controlled by the knurled knob lever 53, the number of cuts is adjusted, necessary for effecting a complete revolution of the ratchet wheel and consequently the number of runs necessary for carrying out a screw cutting.

The heeled slide block 56 is mounted in a rotary casing 57 the angular position of which is adjusted by a knurled knob lever 58. The run of the heeled slide block 56 being constant and equal to the rise of the cam 55, its action on the cross piece 36 will be zero when the axis of the slide block is parallel with the groove 39 and maximum when said axis is perpendicular to the groove.

The adjustment of the depth feed is thus obtained by the adjustment of the angular position of the casing 57.

The details of the engagement device and automatic stopping are shown in Figures 8 to 14.

The device being in the rest position (Fig. 8), starting is effected by operating a ball handled lever 59.

Figure 9:
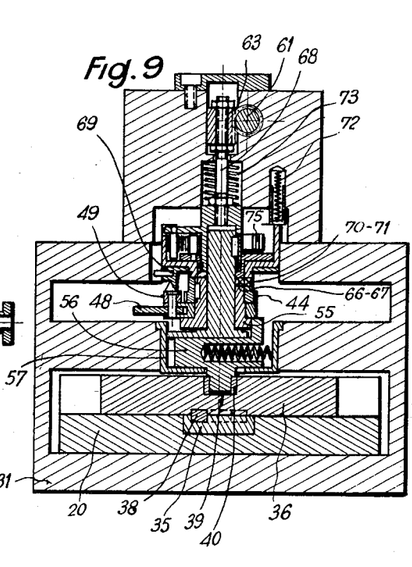
Figure 9 is a section along line IX—IX, Figure 1, the mechanism being in the rest position.
Figure 10:
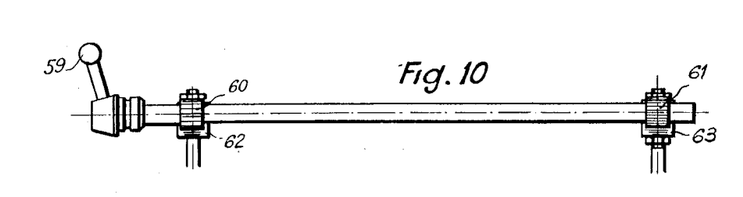
Figure 10 shows the common starting control for the pitch selection and depth feed devices.
Figure 11:
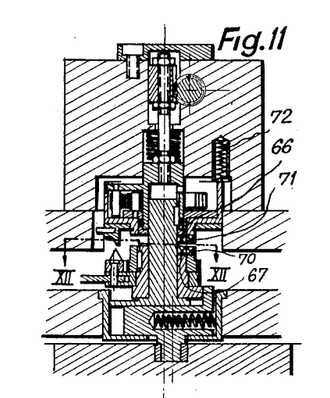
Figure 11 is a section along line XI—XI, Figure 1, the mechanism being in the operating position.
Figure 12:
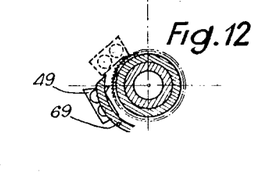
Figure 12 is a section along line XII—XII, Figure 11.

By means of the pinions 60 and 61 and the racks 62 and 63, a needle 64 is disengaged from the notch 65 of the slide block 15 (Fig. 8) and simultaneously the stud 66 is disengaged from the notch 67 provided on a collar of the cam 55 (Fig. 9).

The sliding gear 14 lifted by the needle 64 engages the dog 11 carried by the worm wheel 10. The cams 12 and 13 are driven in rotation.

Figure 13:
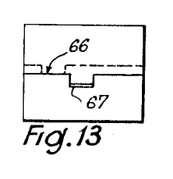
Figure 13 shows a lock for the starting and automatic stop.
Figure 14:
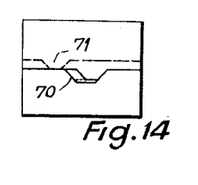
Figure 14 shows a device preparing the stopping of the apparatus.
Figure 15:
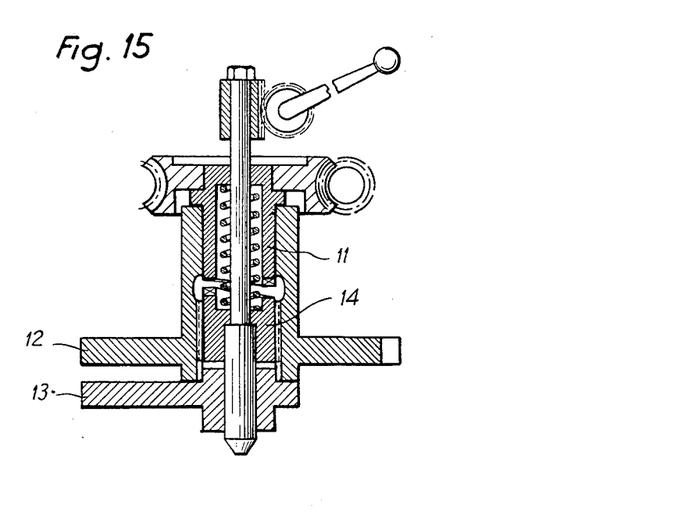
Figure 15 is an axial section through a portion of Figure 2
Figure 16:
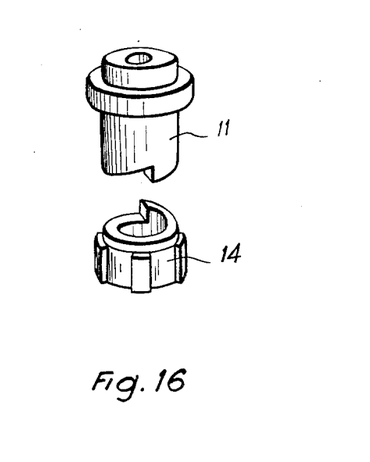
Figure 16 is a perspective view of two of the parts shown in Figure 15.

After the first cut and considering that the ratchet wheel 44 has turned under the action of the pawl 49, the lever 59 is released and the stud 66 comes and bears on the upper face of the cam 55 (Fig. 13).

By means of the threaded rod 68 and the pinions and racks 60, 61, 62 and 63, the needle 64 remains at its raised position and the apparatus remains automatically in gear.

The rotation of the ratchet wheel 44 continuing, the 45° edge of the notch 70 (Figs. 11 and 14) pressing on the 45° edge of the stud 71 associated with a limiter 69 lifts the latter to allow the pawl 49 to effect on the ratchet wheel 44 its entire effective run.

After a certain run of the cam 55, the notch 70 of the ratchet wheel 44 comes under the stud 71 associated with the limiter 69 which moves down under the action of the spring 72.

The function of the run limiter then becomes apparent, which consists, at the end of the work, in suppressing a useful part of the pawl run by disengaging it from the ratchet wheel 44 (Fig. 12) so that the heel of the slide block 56 cannot move beyond the cam 55 without stopping there.

When the heel of the slide block 56 reaches the lower portion of the cam 55, the notch 67 comes under the stud 66 which, pushed by the spring 73 releases the needle 64.

Under the pressure of the spring 74 the needle 64 comes and bears on the upper face of the slide block 15.

The rotation of all cams continues until the time when the notch 65 of the slide block 15 comes under the needle 64; the needle 64 falling in the notch 65 of the slide block 15, the sliding gear 14 disengages the cams 12 and 13 from the worm wheel 10 under the pressure of the spring 74 and the apparatus stops operating.

It should be noted that the automatic stopping of the apparatus occurs at the end of the return run and in a disengaged position.

It should be noted, finally, that the torsion spring 75 secured, on the one hand to the casing of the apparatus and on the other hand to the socket carrying the stud 66 allows said stud 66 to be driven by the notch 67 and to bring it back to a fixed position as soon as it is disengaged when starting again.

This apparatus offers numerous advantages:

The single cam pitch selecting system allows an infinity of solutions between wide pitch limits, without any pinion combination. The adjustment is effected by means of a vernier scale added to the apparatus to vary the angle α. A very high precision is obtained.

Stopping is obtained automatically when the bottom dimension of the thread is reached; the apparatus stops at the end of its return run.

The apparatus being mounted opposite the tool carrying turret, makes it possible to do a screw cutting on the part which has just been machined on the lathe itself, without any dismantling; an absolute concentricity of the screw thread is thus obtained at the same time as a saving in time.

Of course, the invention is not limited to the arrangements described above; on the contrary it covers all modifications thereof.

What is claimed is:

1. Screw-threading apparatus for use with a lathe having a tool carrier and means for guiding the carrier along longitudinal paths parallel to a work piece and for varying the distance of the carrier from the piece comprising a rotatable disk cam controlling the longitudinal displacements of the carrier, means for rotating the cam at constant speed, and a speed change mechanism interposed between the cam and the carrier for selectively varying the speed of longitudinal displacement of the carrier, said speed change mechanism comprising two slides and guide means associated with each slide permitting reciprocating rectilinear movement thereof, the first slide being operatively connected to the cam for actuation thereby and having an element mounted thereon and operatively connected to the second slide for actuation thereof, the second slide having a surface portion in contact with the element mounted on the first slide and inclined to the direction of rectilinear movement of the second slide to define a camming surface relatively to said element during movement of the slides, means being associated with at least one of the slides for varying the angular disposition thereof relatively to the other slide, and the disk cam being of appropriate profile and mounted with its axis of rotation perpendicular to the directions of movement of the slides.

2. Apparatus as in claim 1 comprising a roller mounted on the first slide and engaging the cam.

3. Apparatus as in claim 1 wherein the surface portion of the second slide comprises a heel and wherein the element mounted on the first slide comprises a shoe movable along the heel.

4. Apparatus as in claim 1 comprising a rockable lever operatively connected to the second slide for oscillation thereby and to the carrier for reciprocation thereof.

5. Apparatus as in claim 1 comprising a further cam coaxial with the first cam for controlling the to and fro movements of the carrier before and after the working stroke, a double rocker having two angularly related rock-arms mounted on a common shaft pivotally mounted on the guide means of the first slide, and an auxiliary device for imparting to and fro movements to the carrier, the rock-arms being operatively connected respectively to the further cam and to the auxiliary device.

6. Apparatus as in claim 5 wherein the auxiliary device comprises a slide block operatively connected to the further cam and a cross piece operatively connected to the slide block and to a support slide supporting the carrier.

7. Apparatus as in claim 5 comprising at least one latch device for positive engagement of the cams, said latch device being automatically operative during at least part of the threading operation.

8. Apparatus as in claim 6 including means operatively connecting the slide block to the cross piece and permitting movement of the latter relatively to the support slide.

9. Apparatus as in claim 7 comprising manually operable means for actuating the latch device prior to automatic operation thereof.

10. Apparatus as in claim 8 wherein said means comprise an inclined bolt movable relatively to the slide block and to the cross piece.

11. Apparatus as in claim 10 comprising a further slide block angularly adjustable relatively to the cross piece, a depth cam controlling the further slide block, and a shoe operatively connecting the further slide block to the cross piece.

12. Apparatus as in claim 11 comprising a depth control device governing the rotation of the depth cam and limiting the movement thereof at the end of a working stroke of the tool at a selected position corresponding to the maximum thread depth.

13. Apparatus as in claim 11 comprising at least one latch device for positively engagement of the cams, said latch device being automatically operative during at least part of the threading operation.

14. Apparatus as in claim 13 comprising means inhibiting release of the latch device prior to withdrawal of the tool and comprising a first element actuated by the depth cam and a second element actuated by the cam controlling the longitudinal displacements of the carrier, stopping of the apparatus occurring only after sequential actuation of said elements.

15. In a machine, a speed change mechanism comprising a disk cam rotatable at constant speed, two slides and guide means associated with each slide permitting reciprocating rectilinear movement thereof, the first slide being operatively connected to the cam for actuation thereby and having an element mounted thereon and operatively connected to the second slide for actuation thereof, the second slide having a surface portion in contact with the element mounted on the first slide and inclined to the direction of rectilinear movement of the second slide to define a camming surface relatively to said element during movement of the slides, means being associated with at least one of the slides for varying the angular disposition thereof relatively to the other slide, and the disk cam being mounted with its axis of rotation perpendicular to the directions of movement of the slides.

References Cited in the file of this patent
UNITED STATES PATENTS

| | | |
|---|---|---|
| 1,504,133 | Mueller | Aug. 5, 1924 |
| 2,008,474 | Smith | July 16, 1935 |
| 2,408,876 | Pigott | Oct. 8, 1946 |